United States Patent [19]
Bauer et al.

[11] Patent Number: 5,660,437
[45] Date of Patent: Aug. 26, 1997

[54] CHILD SEAT CAPABLE OF BEING INTEGRATED INTO A MOTOR-VEHICLE SEAT

[75] Inventors: Heinz Bauer; Burckhard Becker, both of D-Solingen; Ulrich Bruhnke, D-Ehningen; Joachim Fausel, D-Tübingen; Ernst-Reiner Frohnhaus, D-Solingen; Josef Klink, D-Nagold; Horst Kohl, D-Ehningen; Frank Krischen, D-Aidlingen; Hans-Jürgen Schlaffke, D-Saulgau, all of Germany

[73] Assignee: C Rob. Hammerstein GmbH, Germany

[21] Appl. No.: 683,163

[22] Filed: Jul. 18, 1996

Related U.S. Application Data

[63] Continuation of Ser. No. 257,557, Jun. 10, 1994, abandoned.

[30] Foreign Application Priority Data

| Jun. 11, 1993 | [DE] | Germany | 43 19 406.0 |
| Sep. 7, 1993 | [DE] | Germany | 43 30 251.3 |
| Sep. 27, 1993 | [DE] | Germany | 43 32 591.2 |

[51] Int. Cl.$^6$ .............. A47C 15/00; A47D 1/00; B60N 2/26
[52] U.S. Cl. .............. 297/237; 297/344.15; 248/157
[58] Field of Search ............. 297/236, 237, 297/344.15, 411.33; 248/407, 408, 281.1, 157, 423

[56] References Cited

U.S. PATENT DOCUMENTS

| 4,979,773 | 12/1990 | Eubank | 248/423 |
| 5,265,934 | 11/1993 | Forget | 297/237 |
| 5,282,666 | 2/1994 | Demick et al. | 297/337 |
| 5,324,027 | 6/1994 | Nye | 248/281.1 |

FOREIGN PATENT DOCUMENTS

| 3020212 | 12/1981 | Germany | 297/237 |
| 4032670 | 11/1991 | Japan | 297/237 |
| 3267011 | 11/1991 | Japan | 297/237 |

*Primary Examiner*—Peter M. Cuomo
*Assistant Examiner*—Anthony D. Barfield
*Attorney, Agent, or Firm*—Eckert Seamans Cherin & Mellott

[57] ABSTRACT

A child seat for a motor vehicle is adjustable between a lower retracted state at the normal seat height of the motor vehicle seat, and an unfolded position in which the child seat stands out from the normal seat height for occupation by a child. A frame and a supporting structure are connected and hinge-jointed to each other by front and rear parallelogram arms. At least one diagonal locking brace is hinged on one side to one of the frame, the supporting structure and one of the parallelogram arms, and on an other side is guided by a tranverse part in a longitudinal guide. A locking segment has at least one holding notch to accommodate the transverse part, with flanks extending transversely to the longitudinal guide and a handle for releasing the tranverse part from the holding notch. The handle extends over a region of a front surface of the child seat.

20 Claims, 4 Drawing Sheets

CHILD SEAT CAPABLE OF BEING INTEGRATED INTO A MOTOR-VEHICLE SEAT

This is a continuation of application Ser. No. 08/257,557 filed Jun. 10, 1994, now abandoned.

FIELD OF THE INVENTION

This invention relates to a child seat capable of being integrated into a motor-vehicle seat, in particular for a seat in the back-seat region of a motor vehicle. When not needed, the child seat is in a low retracted state, in which its seat upholstery does not stand out against the upholstery of the motor-vehicle seat. Thus in practice it is virtually inconspicuous, the motor-vehicle seat can be used normally by adults. However, the child seat can also be put into an unfolded position, in which the seat upholstery of the child seat does stand out from the upholstery of the motor-vehicle seat, thus achieving the higher seat position necessary for a child.

DESCRIPTION OF THE PRIOR ART

With a known child seat of this type the supporting structure and frame are connected by parallelogram arms, with which a suitable locking device is associated, enabling the adjustment of the child seat in the two said positions. When it is shifted from the low retracted state into the unfolded position, the parallelogram design also causes the front edge of the supporting structure to swivel back to the backrest of the motor-vehicle seat. Thus is guaranteed that children have a shorter seat surface, but can still lean against the back rest of the motor-vehicle seat, without this having to be specially adjusted or altered for them.

Furthermore a constructional solution is known for a child seat, in which a broadened armrest for the back seats is used as base for the child seat.

The operation of the child seat with parallelogram kinematics is disadvantageous. Further, its constructional design is unsatisfactory, in particular with regard to the locking devices for the retracted state and the unfolded position.

SUMMARY OF THE INVENTION

At this point the invention comes in. It has the object to provide a child seat in parallelogram kinematics capable of being integrated into a normal motor-vehicle seat as an accessory at the initial outfitting stage in such a way, that it is simple to operate and to assemble.

This object is achieved by a child seat capable of being integrated into a motor-vehicle seat, in particular for a seat in the back-seat region, which is adjustable between a low retracted state at normal seat height and an unfolded position, in which it stands out against the normal seat height, with a frame and a supporting structure, which are hinge-jointed to each other by front and rear parallelogram arms, with at least one diagonal locking brace, which on one hand is hinged to the frame, to the supporting structure or to one parallelogram arm, and on the other hand is guided by a transverse part in a longitudinal guide of at least one parallelogram arm, of the frame or of the supporting structure and with a locking segment, which has at least one holding notch to accommodate the transverse part and a handle for releasing the transverse part from the holding notch.

An easy-to-reach activation and in addition a secure locking of the supporting structure in the unfolded position is achieved by the locking segment. In the longitudinal guide, which is preferably formed in at least one front parallelogram arm, preferably in both front parallelogram arms, the transverse part is guided, the position of the transverse part within this longitudinal guide is fixed by the locking segment, and the unfolded position thus secured. The diagonal locking brace causes the four-bar linkage mechanism to be secured very effectively and thus a stable unfolded position of the supporting structure to be achieved with minimal consumption of material. Providing a parallelogram arm, such as the rear arm, with an associated spring so as to stand the seat up several millimeters, e.g., 20–60 and preferably 40 mm, has shown itself to be very advantageous, whereby a spring is provided, which in its normal position raises the supporting structure sufficiently so that it is several millimeters above the retracted state. This spring is also termed midposition spring. The spring guarantees that the child seat carries out a movement, namely to the midposition, whenever the locking device is released either in the unfolded position or the retracted state. This is of particular advantage during the unfolding movement, as in advantageous further development the parallelogram arms are on one level in retracted state and unfolding of the seat by merely pressing up the front edge of the child seat would not lead to a folding up of the rear parallelogram arms. Furthermore the middle position achieved by force of the midposition spring is also reminiscent of the fact that the child seat should be locked in retracted state when not in use and must be consciously unfolded if it is to be put into the unfolded position.

A V-shaped bent leaf spring has proved particularly successful as the midposition spring, being associated with at least one rear parallelogram arm and guided around a joint shaft of this rear parallelogram arm. In retracted state this spring is essentially shaped like a hairpin, which also leads to it being called hairpin-spring.

Furthermore it has proved to be particularly advantageous to provide an adjustable locking device under the supporting structure, which on one side has a catch extending under a projecting locking member provided in the frame and on the other side is connected by an arm to the locking segment in such a way, that activation can be carried out with the handle of the locking segment. The locking device has the function of locking the child seat in the low retracted state. In this position tension can be exerted on the arm through pressure on the handle of the locking segment, which leads to the catch pulling free of the projecting locking member, so that the child seat can be unfolded. The action of the midposition spring makes the process of unfolding particularly simple. Thus the locking devices of the child seat are operated by a handle both in the low retracted state and in the unfolded position.

Furthermore, in advantageous further development, a pull-back spring is associated with said locking device, the catch and locking segment are prestressed into their locked position. Not only does it secure the locked positions in retracted state and unfolded position, but also makes the components involved rattleproof.

It has proved to be particularly advantageous to be able to unfold the child seat to at least two different height settings. To this end it is suggested either that at least two holding notches be provided on the locking segment so that the transverse part can be inserted into one or at least the other holding notch and thereby two different height settings be available, or it is suggested that the transverse part be connected to a sliding part guided in the longitudinal guide and having at least one transverse projection corresponding to the transverse part which can engage with the holding notch of the locking segment. In this way a different height setting is achieved than when the transverse part engages in the holding notch. In a further development the transverse part can be omitted and multiple transverse projections are provided on the sliding part.

In order to avoid a user reaching into the parallelogram structure and possibly incurring injury, and furthermore in order to rule out toys or other objects falling between the sheet metal base and the supporting structure and thus impeding the functioning of the child seat, an all-round apron is provided, which connects the seat upholstery above the supporting structure with the normal seat upholstery. This apron also hides the parallelogram structure from view. The apron is made from an elastic, foldable, stretchable or in other ways suitable material.

For the lap belt a guide part located on each side of the supporting structure has shown itself to be very advantageous, guaranteeing that the lap belt closely fits the pelvic region of a child. With smaller children a safety cushion can be provided in addition, which the lap belt runs through and which is above the thighs of a child.

Finally it has proved particularly successful to provide a calf rest below the supporting structure in its retracted state. This is fastened to the frame or even to the body component located below it, it does not move with the child seat but rather it only becomes accessible and is released when the child seat is unfolded. Smaller children can put their feet on the calf rest, the legs of larger children are guided in such a way that they do not go to sleep.

BRIEF DESCRIPTION OF THE DRAWINGS

Further advantages and features of the invention arise from the remaining claims and the following description of embodiments, not be interpreted as restrictive, which are explained in detail with reference to the drawing. The latter shows in:

As the Figures show, the child seat according to the invention has a frame 20, which is essentially formed from a flat bent plate and from supporting structures standing up from it for joints of the front and rear parallelogram arms 22, 24 which are still to be discussed. The metal sheet is adapted to fit the shape of a body component 26 (FIGS. 2, 4, 7), which forms the seat support of the motor-vehicle seat not shown here in detail. The frame 20 is connected to this body component 26 by pop-rivets (Popniete) or the like. In the design shown the child seat is thus an accessory, which is installed in particular at the initial outfitting stage.

Two front and two rear parallelogram arms 22, 24 are provided. They are hinged to the frame 20 in joint regions. At their opposite end regions they are hinged in a similar way to a supporting structure 28, which like the frame 20 is essentially constructed from a plate-shaped component forming the actual seat for a child and the supporting profiles making up the link joint. The supporting structure takes on the function of the seat support for the child seat. It has a seat upholstery 30.

Additionally a diagonal locking brace 32 is hinged onto the joint shaft of one rear parallelogram arm 24 at the frame 20, it has a transverse part 34 at its other end that engages in a longitudinal guide 36 formed in the respective front parallelogram arm 22, which guarantees that the transverse part 34 does not escape from the longitudinal guide 36. In the first embodiment according to the FIGS. 1 to 5 this transverse part is formed on each side by one of the ends of a tie-bar bent at right angles, which connects both sides.

Figure 1:
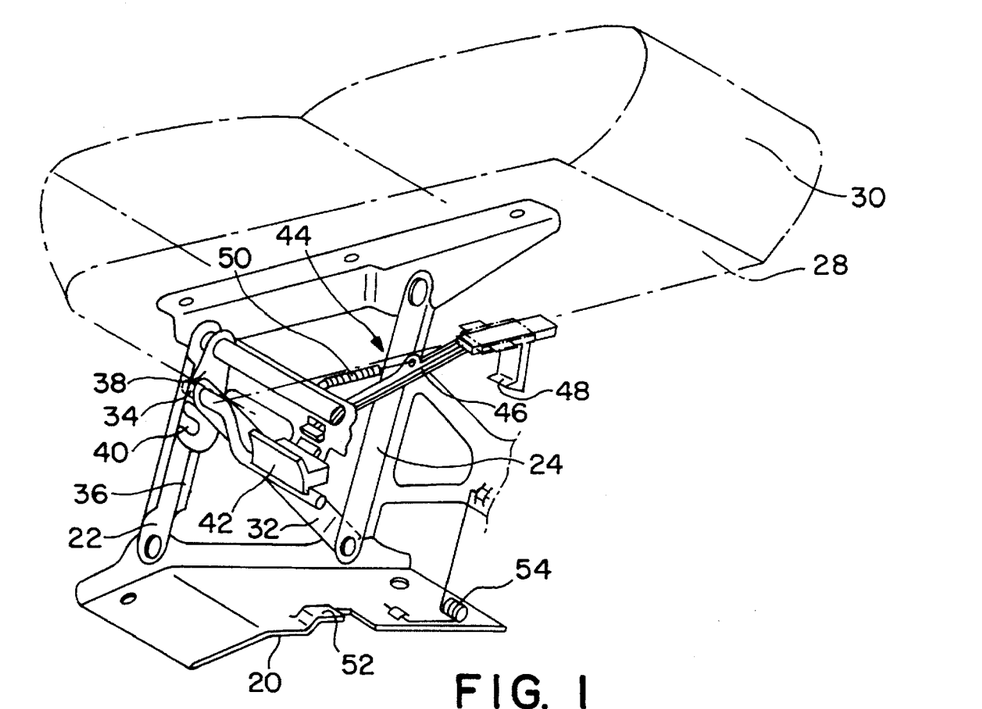
FIG. 1 a diagonally frontal end-view partially in section of the child seat in unfolded position, FIG. 2 the child seat according to FIG. 1 in unfolded position, FIG. 3 a perspective drawing of the child seat in unfolded state and with a child as passenger, FIG. 4 the child seat according to FIG. 1 in unfolded state FIG. 5 locking segment as of FIG. 1 with two holding notches for two different height settings, FIG. 6 a representation corresponding to FIG. 1, however with an additional sliding part for different height adjustments of the child seat, FIG. 7 a side view similar to FIG. 4, however in an altered design, FIG. 8 aside view similar to FIG. 4, however with a longitudinal guide along the frame FIG. 9 a side view similar to FIG. 4, however with a power-operated drive FIG. 10 a representation similar to FIG. 5 with a child-proof locking segment and an extendible region FIG. 11 a representation similar to FIG. 4 with a child-proof mechanism activated by the weight of the passenger.

The locking of the child seat in the unfolded position (see FIG. 1) now occurs through combined action of the already mentioned components—transverse part 34 and longitudinal guide 36 with a locking segment 38. The latter is hinged to the link point of one front parallelogram arm 22 with the supporting structure 28 and is placed on a transversal shaft. It has two holding notches 40 to accommodate the transverse part 34. In locked state, as shown in FIG. 1, one holding notch, namely the upper one, 40, is engaged with the transverse part 34. As FIG. 1 shows, the holding notch 40 is open to the front, i.e. towards the front edge of the seat; by swivelling the locking segment 38 in a counter-clockwise direction (in the viewing direction of FIG. 1) the locking segment 38 disengages from the transverse part 34 and the locking is released. Accordingly the flanks of the holding notch 40 are essentially near the arc of a circle around said swivel shaft of the locking segment 38.

Finally the locking segment 38 also has a handle 42, which projects from its lower region. Pressure on the handle induces the aforementioned swivel movement and guarantees that the transverse part 34 disengages from the holding notch 40. The handle 42, which is made so as to be elastic, can additionally act as a kind of safety device, which with an upward projecting elastic finger normally prevents the locking segment 38 from swivelling free and does not release the locking segment 38 until sufficient pressure has been exerted on the handle 42.

Below the supporting structure 28 a locking device 44 is provided, which has an arm 46 and a catch 48. It is prestressed by a pull-back spring 50 into its locking position. As FIG. 1 shows, the arm 46 laps over a peripheral region of the locking segment 38, thereby creating a link joint. The arm 46 is thus pushed back and forth by swivelling the locking segment 38, as too is the catch 48 connected with the arm 46, the releasing movement occurring against the action of the pull-back spring 50.

The catch 48 is associated with a projecting locking member 52 in the frame 20. This is essentially formed by a hole in the frame 20. The catch 48 is designed in such a way that when retracting it is carried by the edge of the hole and automatically locks into place under the projecting locking member 52 when the seat is moved into the retracted state.

The projecting locking member 52 is released from this position by activation of the handle 42. The locking segment 38 is swiveled by activation of the handle 42, it drives the arm 46 which in turn pulls the catch 48 forward such that it disengages from the projecting locking member 52.

In another design the catch 48 projects forward as far as the front edge of the seat and the arm 46 is pressed through the locking segment 38 so as to release the catch 48 from the projecting art.

There may be provided only one lateral diagonal locking brace 32 or one central diagonal locking brace 32, but there may also be provided a diagonal locking brace 32 for each lateral pair of parallelogram arms 22, 24. The locking segment 38 is designed correspondingly. It extends over a region of the front surface of the seat, as shown in FIG. 1. This latter solution has the advantage of a relatively large handle 42 being available.

The lower joint of each rear parallelogram arm 24 is associated with a seat-raising spring, henceforth termed midposition spring 54. In the embodiment shown it is designed as a leg spring. It may also be a hairpin-shaped or a V-shaped leaf spring, which on one hand is fixed onto the frame being riveted or inserted there, and on the other hand is attached to the associated rear parallelogram arm. It encompasses the shaft of the swivel joint between the parallelogram arm 24 and the frame 20. When the seat is not under load, provided that no locking has taken place, it effects a position of the supporting structure 28 approximately 40 millimeters above the frame 20. From this position both end positions are within easy reach, namely the unfolded position and the retracted state.

Figure 2:
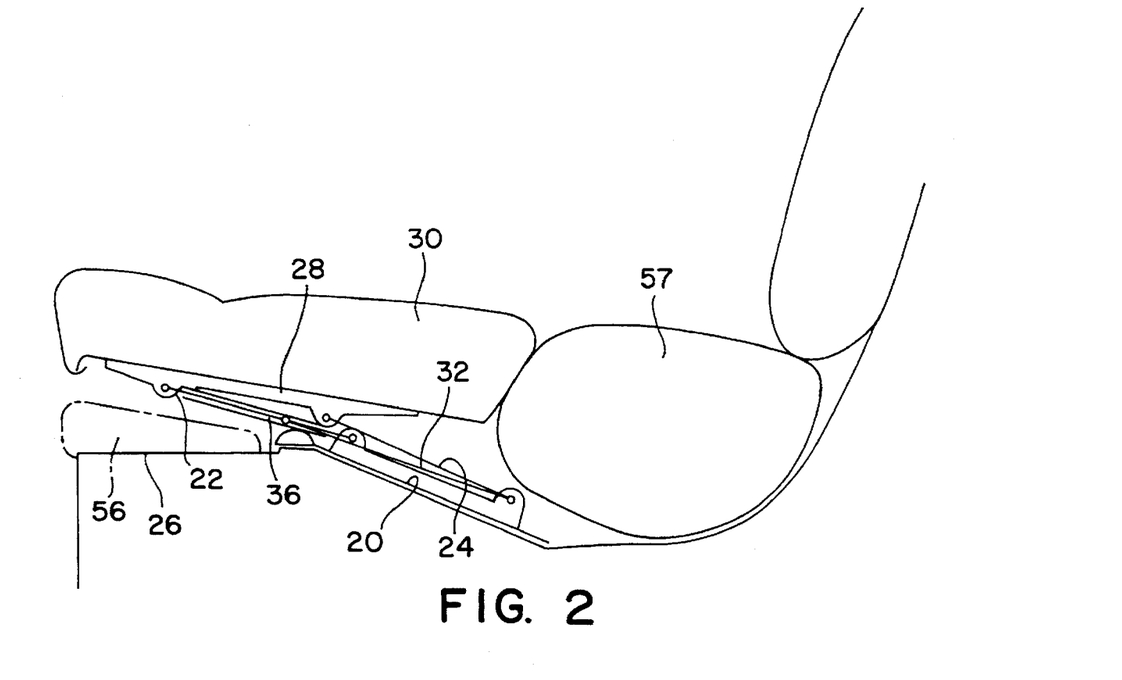

In FIG. 2 the outline of the upholstery of the motor-vehicle seat is also shown. When the child seat is in retracted state its seat upholstery 30 is at the same height. Below the front section of the supporting structure 28 and in its retracted state is a calf rest 56, which is fixedly connected with the frame 20 or—as shown in FIG. 1—with the associated body component 26. When the child seat is in retracted state it goes practically unnoticed, it is within the normal contour of the front edge of the motor-vehicle seat. It only becomes visible when the child seat is brought into its unfolded position. The calf rest 56 consists essentially of an upholstery which has an upward-facing surface for a foot to be placed on and which has a soft padding facing forwards toward the front edge for the calves of bigger children.

Figure 4:
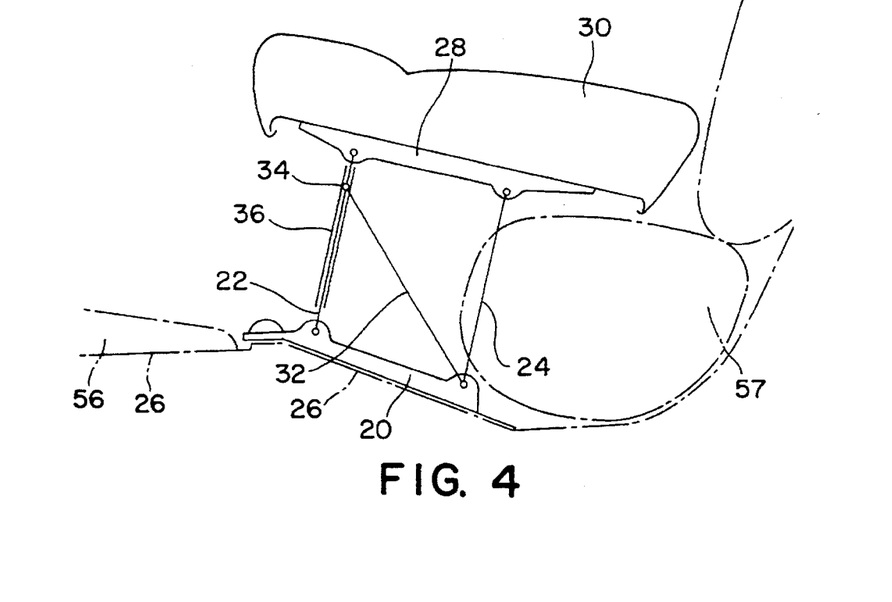

As can be seen in particular from FIGS. 2 and 4, the rear edge of the supporting structure 28 and the seat upholstery 30 runs around cushion component 57 during the unfolding and retracting movement. The latter may or may not be (partially) incorporated into the movement. Thus, for example, said rear edge may be connected with the cushion component by a web of cloth forming a joint.

Figure 3:
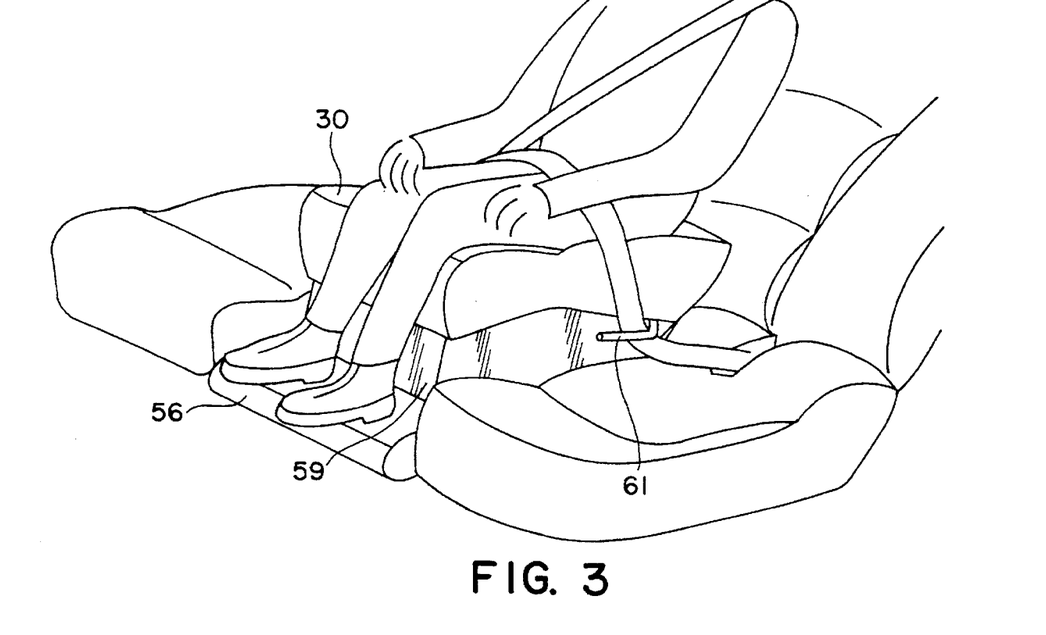

The seat upholstery 30 is connected by suitable means with the neighbouring parts of the upholstery so that there is no undue access to a hollow space anywhere. As shown in FIG. 3, an apron 59 made from strongly flexible material is provided to close off the child seat on all sides.

As FIG. 3 shows, guide parts 61 for the safety belt are provided on both sides of the child seat, thus giving it a course suitable for children.

Figures 5, 6, 7, 8, 9:
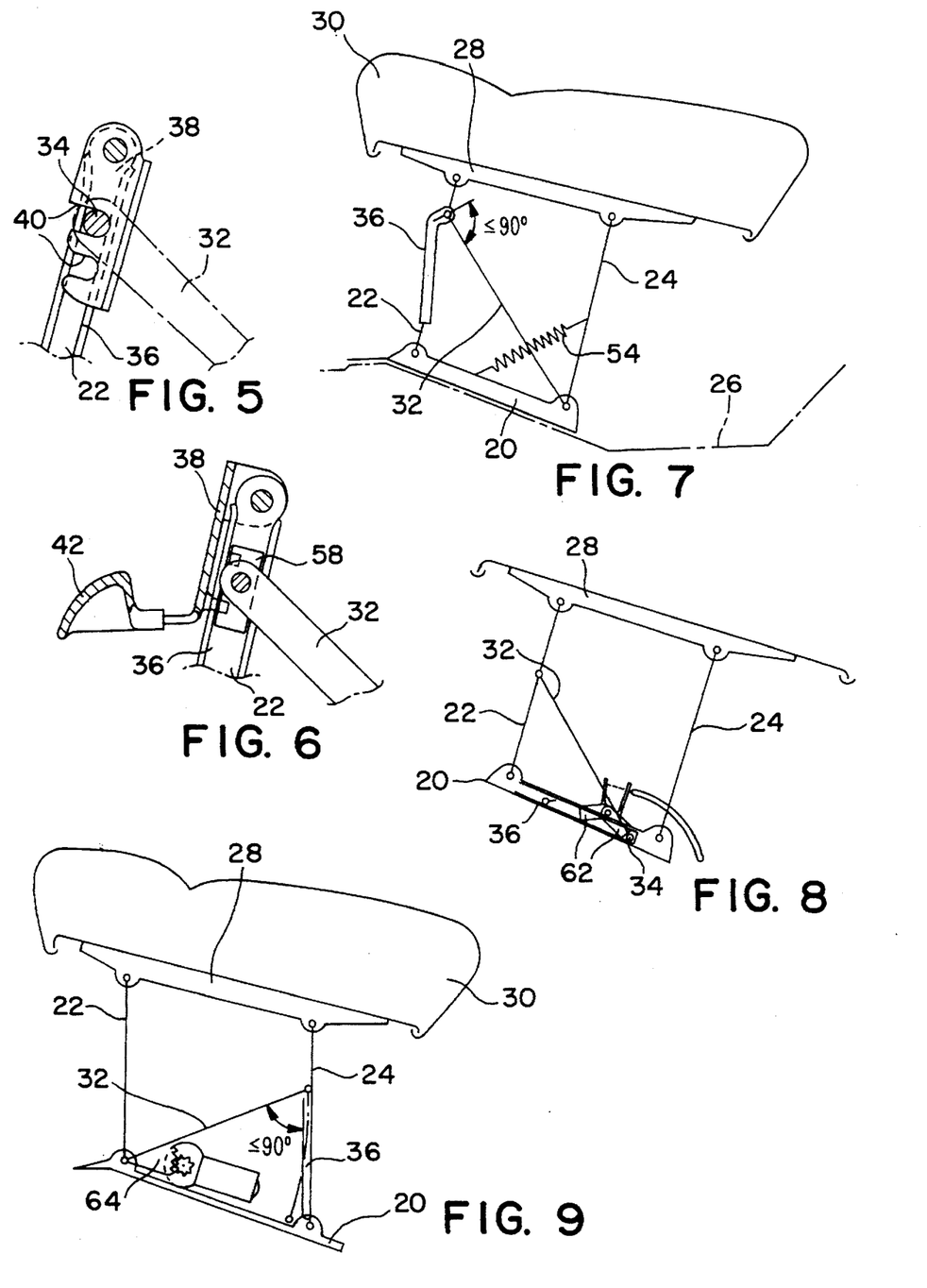

In FIG. 5 the locking segment 38 is shown with two holding notches 40 one below the other. In unfolded position it allows adjustment to two different heights.

Another solution for two different height settings is shown in FIG. 6. Here in the longitudinal guide of the front parallelogram arm 22 a sliding part 58 is provided, which is joint-linked to the diagonal locking brace 32 and has two recesses, which take on the function of the holding notches 40. A peg of the locking segment 38 can engage in it and at the same time also extends through the leading wall of the longitudinal guide, which leads to improved locking.

In advantageous further development the diagonal locking brace 32, of which there is at least one, can also (at least partially) be executed as a pressure spring, consisting for example of two sections, which slide over each other in the middle region and are connected by a pressure spring. In this way a springing of the supporting structure 28 against the frame 20 is achieved. On the other hand a two-piece diagonal locking brace can also allow for the locking of the two parts against each other by means of a suitably formed locking segment, thus locking the four-bar linkage mechanism.

A frame 20 need not necessarily be provided as separate component, it may also be an integrated part of the body component 26. In this case the joint regions for the parallelogram arms 22, 24 would always be provided, but used only if and when the vehicle is to be equipped with a child seat.

FIG. 7 shows a design similar to the first embodiment, however the longitudinal guide is kinked in such a way in its upper region that in this region it extends perpendicularly (within the angle of self-locking) to the orientation of the (rectilinear) diagonal locking brace 32. Thus a separate locking segment is unnecessary.

FIG. 8 shows a design with the longitudinal guide being formed on the frame 20 or fixedly connected to it. On one side the diagonal locking brace 32 is hinged to at least one front parallelogram arm 22, on the other side it is guided in the longitudinal guide of the frame 20. It has a transverse part there and is locked by two locking arms 62, which are activated by a Bowden wire and located in such a way that one locks the unfolded position depicted, while the other fastens the retracted state.

Finally, FIG. 9 shows a power-operated actuation. The diagonal locking brace 32 is connected in one end region to a toothed segment 64, which can be adjusted by a power-driven pinion. In its other end region the diagonal locking brace is guided in a longitudinal guide, which is carried by or formed on a rear parallelogram arm 24. In the depicted locked position there is an angle of $\leq 90°$ between the longitudinal guide and the diagonal locking brace 32. The mechanism of the motor is self-locking.

Figure 10:
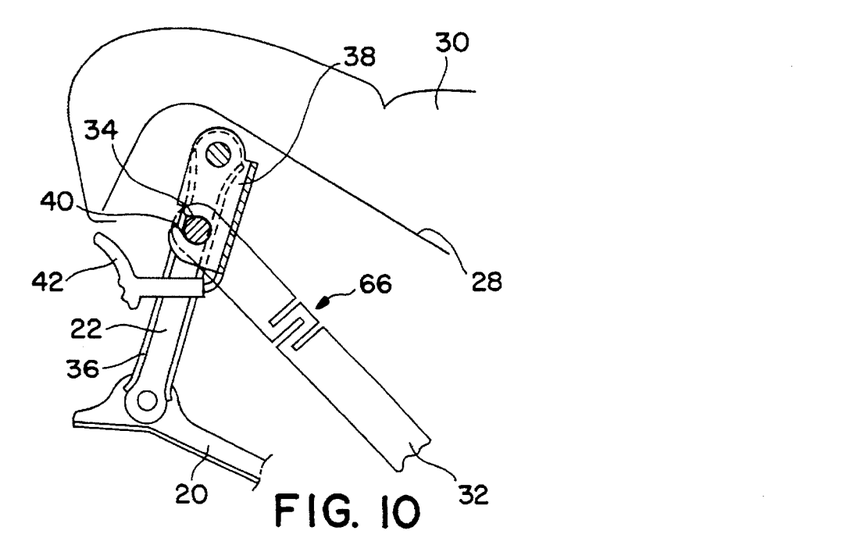

FIG. 10 shows a child-proof locking device. The shape of the flanks of the holding notch is chosen in such a way that the supporting structure 28 has to be raised in order to release the transverse part. A child according to FIG. 3 weighting down the supporting structure 28 will not manage to release the locking device by the handle. As FIG. 10 shows, the holding notch 40 is not shaped such that its flanks form the arc of a circle around the swivel shaft of the locking segment 38, rather the flanks draw nearer the swivel shaft the closer they are to the opening of the holding notch 40.

In FIG. 10 furthermore, and independent of the concrete design of the child-proof locking device, an extendible region 66.is provided additionally in the diagonal locking brace 32. It is meander-shaped and has the following function: the diagonal locking brace is under tension. When the vehicle which the child seat is in decelerates rapidly as a result of an accident, the supporting structure 28 moves forwards, in particular due to the forces of acceleration which a child is subject to. Under the action of these accident-related forces of acceleration the extendible region 66 expands. With normal accelerations which are not accident-related the extendible region 66 does not expand. By the lengthening of the diagonal locking brace 32 in its extendible region 66 and with accident-related acceleration the supporting structure 28 with the seat upholstery 30 can swivel forwards more than normal, in other words the seating depth increases. This in turn compensates for the seat-belt elongation which also occurs under accident-related acceleration. The extension of the extendible region 66 requires energy and thus in an accident-related situation energy is absorbed in the region of the diagonal locking brace 32.

The practical design of the extendible region 66 is open to choice, FIG. 10 shows only one simple design. It may also be a Z- or S-shaped region, which may or may not jut out above the actual contour of the diagonal locking brace 32. Decisive is only that an increase occurs in the overall length of the diagonal locking brace under accident-related acceleration, i.e. under forces adequate to expand the diagonal locking brace 32.

Figure 11:
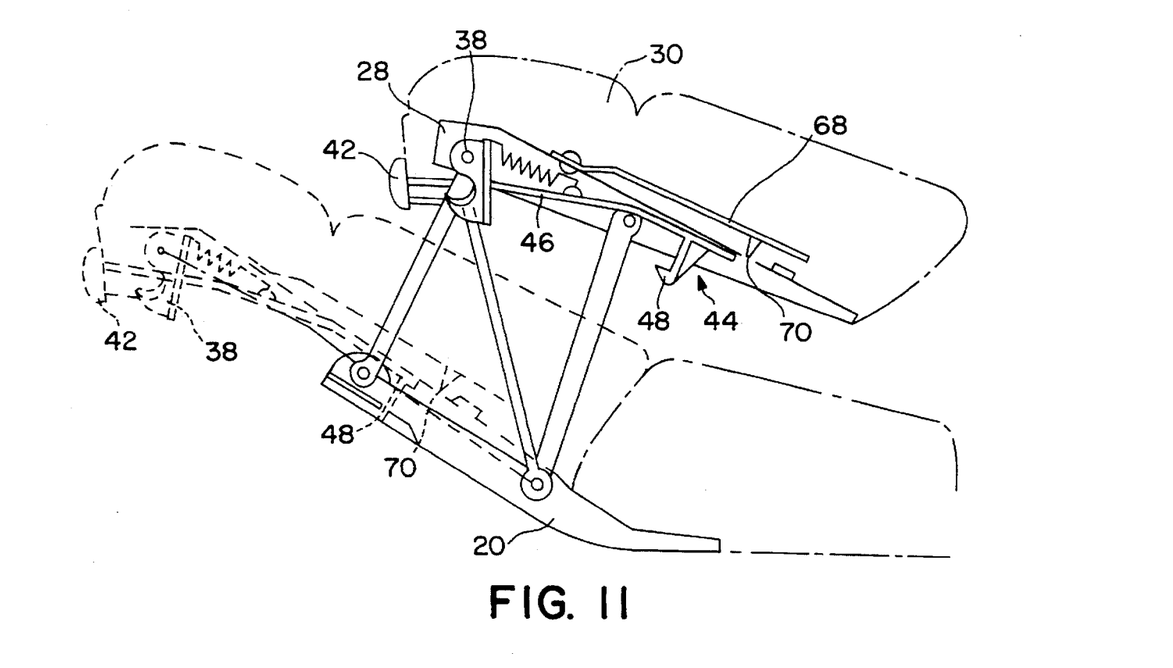

As FIG. 11 shows, an elastic component 68 sticks up from the supporting structure 28, it is mounted on the supporting structure and is essentially formed by a leaf spring or a broad spring steel sheet. It is connected with a blocking member 70. It is associated with an opening in the supporting structure. Similar to the first embodiment according to the FIGS. 1 to 4, a locking device 44 is located below the supporting structure. In this case, however, it is designed in one piece and also encompasses the handle 42, the arm 46 is connected in one piece with the catch 48 and the handle 42, a driving slot is provided, which the locking segment 38 engages in and by which the locking segment 38 is activated. The range of movement of this locking device intersects with the range of movement of the blocking member 70. If the latter is in a first position with unweighted seat and as shown in FIG. 11, the locking device 44 can be moved back and forth as in the first embodiment. However, if the blocking member is in a second position (not shown in FIG. 11), in which it extends through the opening in the supporting structure 28, it obstructs the movement of the locking device 44 such that the latter cannot be moved to the right (in FIG. 11), which means however that the locking segment 38 cannot be swivelled out of its depicted locking position. Thus the seat cannot be moved downwards out of the unfolded position, it remains in the unfolded position as long as the blocking member 70 obstructs the movement of the locking device 44.

The elasticity of the elastic component 68 is chosen so that the blocking member is always in the first position when the seat is not under load. As soon as the seat is weighted down by a child, the blocking member 70 shifts to its second position and stays there as long as the seat is under load. In practice the elasticity is chosen such that the elastic component 68 holds the blocking member 70 reliably in the first position when the seat is not under load. An additional load of about 2 to 4 kg is sufficient to move the blocking member 70 to the second position and keep it there.

In the construction shown the elastic part is a spring steel sheet which is about half the length of the supporting structure 28 and is riveted onto the front third of the latter. It extends over about half the width of the seat.

In the retracted position of the seat the blocking member 70 is without effect. The path of the release movement of the locking device is chosen shorter, e.g. 50% shorter, for the retracted state than it is for the unfolded position. FIG. 11 shows this. In the retracted state shown in dash-dots the locking device 44 is a significant distance further from the blocking member 70 than it is in the unfolded position.

The safety device described can also be constructed in ways other than those described in the embodiment explained. For example, the blocking member 70 can also act directly on the locking segment 38 or on a separate handle 42. The locking device 44 can be constructed using separate parts (as in the first embodiment). Instead of a leaf spring a metal sheet can be provided, which is propped up against the supporting structure by a pressure spring. The blocking member 70 can be combined in one piece with the elastic component 68.

We claim:

1. In combination, a child seat and a motor vehicle seat, wherein the child seat is adjustable between a lower retracted state at a normal seat height of the motor vehicle seat, and an unfolded position in which the child seat stands out from the normal seat height of the motor vehicle seat, the combination comprising:

a frame and a supporting structure, which are connected and hinge-jointed to each other by front and rear parallelogram arms;

at least one diagonal locking brace, which on one side is hinged to one of the frame, the supporting structure and one of the rear parallelogram arms, and on an other side is guided by a transverse part having an end portion coupled to the diagonal locking brace, the end portion being engaged in a longitudinal guide of at least one of the front parallelogram arms;

a locking segment hingedly coupled to the front parallelogram arm, said locking segment having at least one holding notch to accommodate the end portion of the transverse part that is extending transversely to the longitudinal guide and a handle for releasing the end portion from the at least one holding notch, said handle extending over a region of a front surface of the child seat.

2. The combination according to claim 1, further comprising a spring associated with at least one said parallelogram arm, and wherein the spring in a normal position prestresses the child seat when the supporting structure is not under a load in such a way that the child seat stands up by a distance above the retracted state.

3. The combination according to claim 2, wherein the spring comprises one of a leg spring and a leaf spring bent to a V-shape, and encompasses a hinge point of one of the parallelogram arms.

4. The combination according to claim 2, further comprising means for locking the child seat, located movably below the supporting structure, the means for locking on one side having a catch which in the retracted state of the child seat extends under a projecting locking member of the frame and locks in the retracted state, and on an other side is connected by an arm to the locking segment such that by activation of the handle the locking means is released by disengaging the catch and the projecting locking member.

5. The combination according to claim 4, wherein the locking means is associated with a pullback spring, which prestresses the catch and the locking segment toward a locked position.

6. The combination according to claim 4, further comprising a locking component which blocks the means for locking when the supporting structure is under a load.

7. The combination according to claim 6, wherein one of the holding notches of the locking segment has flanks, and an open end of the flanks closer to a swivel shaft of the locking segment than depth of the holding notch.

8. The combination according to claim 2, wherein the spring is associated with a rear one of the parallelogram arms.

9. The combination according to claim 2, wherein the distance is between about 20 and 60 millimeters.

10. The combination according to claim 9, whereto the distance is about 40 millimeters.

11. The combination according to claim 1, wherein the locking segment has at least two holding notches for the adjustment of the supporting structure to at least two different unfolded positions.

12. The combination according to claim 1, wherein the supporting structure is adjustable to at least two different unfolded positions by the end portion of the transverse part being hinge-jointed to a sliding part guided in the longitudinal guide.

13. The combination according to claim 1, wherein the supporting structure has upholstery and further comprising aprons coupling the upholstery of the supporting structure to upholstery of the vehicle seat.

14. The combination according to claim 1, wherein the frame comprises a flat member which is placed upon and fastened to a seat support of the motor vehicle seat equipped with the child seat.

15. The combination according to claim 1, wherein in the retracted state the parallelogram arms reside in one plane.

16. The combination according to claim 1, further comprising a guide part for a lap belt on either side of the supporting structure, through which the lap belt can be threaded.

17. The combination according to claim 1, wherein the diagonal locking brace is put under tension by a load placed on the supporting structure.

18. The combination according to claim 1, wherein the diagonal locking brace has a region which is extendible under application of energy.

19. The combination according to claim 18, wherein the extendible region comprises one of a meander-, S- and Z-shaped region of the diagonal locking brace.

20. The combination according to claim 1, further comprising an elastic component located movably on the supporting structure and extending when prestressed, and wherein said elastic component connected to a blocking member, the elastic component having an elasticity chosen such that the blocking member is at a first position when the seat is not under a load and at a second position when the seat is under a load approximating a weight of a child, and wherein only in the unfolded position and only in the second position of the blocking member is the blocking member disposed to prevent movement of one of the locking segment and a component connected to the locking segment for obstructing movement of the child seat out of the unfolded position.

* * * * *

UNITED STATES PATENT AND TRADEMARK OFFICE
CERTIFICATE OF CORRECTION

PATENT NO. : 5,660,437
DATED : August 26, 1997
INVENTOR(S) : Heinz Bauer et al

It is certified that error appears in the above-indentified patent and that said Letters Patent is hereby corrected as shown below:

Column 1, line 14, after the word "out", delete "against" and substitute therefor --from--.

Column 3, after the description of FIG. 11 and preceding the next paragraph, insert the subtitle --DESCRIPTION OF THE PREFERRED EMBODIMENTS--.

Column 5, line 9, delete "art" and substitute therefor --part--.

Column 5, line 16, delete "latter solution".

Claim 6, column 8, line 61, delete "claim 4" and substitute therefor --claim 1--.

Claim 7, column 8, line 66, after the word "flanks", insert --is--.

Claim 20, column 10, line 14, after the word "component", insert --is--.

Signed and Sealed this

Fourteenth Day of July, 1998

Attest:

BRUCE LEHMAN

*Attesting Officer*     *Commissioner of Patents and Trademarks*